Patented Feb. 14, 1939

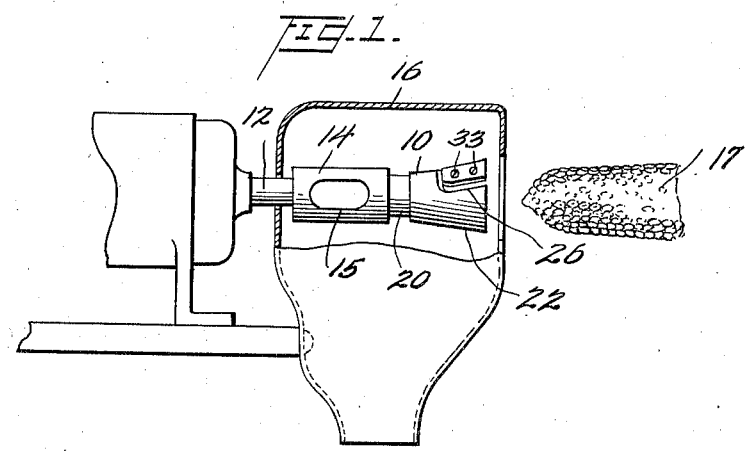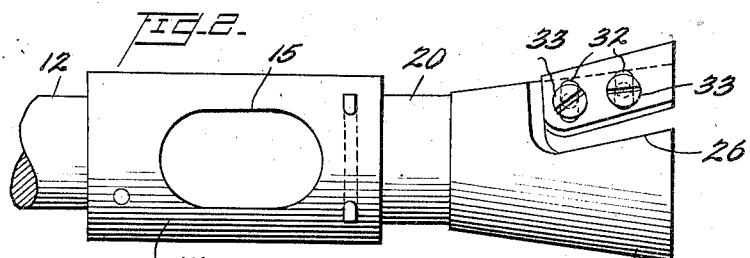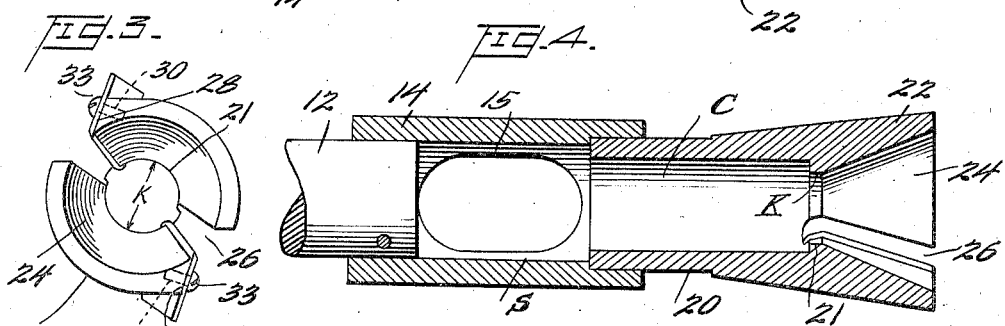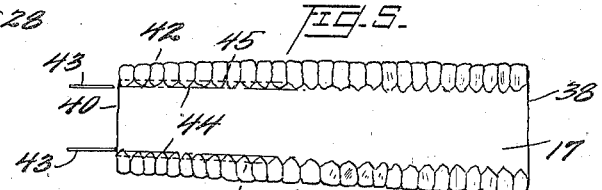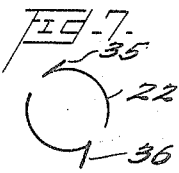

2,147,548

UNITED STATES PATENT OFFICE 2,147,548

GREEN CORN TRIMMER

Charles Edwin Rife, Baltimore, Md., assignor to The Sinclair-Scott Company, Baltimore, Md.

Application October 13, 1937, Serial No. 168,798

3 Claims. (Cl. 130—9)

This invention relates to machines used for preparing corn for canning, and more particularly to cutters for trimming the silk end of ears of green corn for preparing the ears for the cutting machine. The primary object of the invention is to provide a rotary device which not only removes the small deformed grains or worm-eaten grains from the end of the ears but which also shapes the end for better reception by the cutting machine.

In canneries where green corn is preserved the corn goes through a series of hand and automatic operations before it is finally sealed in the can. The first two steps after being unloaded from the field wagons consists of a combined butting and husking operation which removes the stem or butt end of the ears by transverse cuts normal to the longitudinal axis of the ears and which then removes the husks and delivers the naked ears to a conveyor. A number of operators, stationed along the conveyor seize the ears, trim off the silk-ends, remove the worm eaten grains and toss the ears back on the conveyor or to a different conveyor which carries them to the cutting machine where the normal kernels or grains are removed. In the past this trimming operation has been done either by hand knives or by rotary machines which gave considerable trouble due to clogging which always delayed operations, often causing temporary shut-downs of the whole plant. Some trimming machines are provided with devices for ejecting pieces of cob causing a stoppage but for maximum efficiency these machines depend on the attention of the operator which varies greatly in workmen and over the days work, thus a naturally inattentive or tired operator often continues using a clogged trimmer and passing half-finished ears on to the cutting machine with the result that low grade corn gets into the cans. In any event, such machines are relatively costly and are time-consuming in operation.

An object of this invention is to provide a trimmer which can be operated all day long without clogging, without any attention whatever and furthermore is of extremely sturdy and simple design, can be easily and quickly cleaned or adjusted and which can be manufactured and maintained at a very low cost as compared to some trimming machines now on the market.

In the drawing:

Figure 1 is a view of the trimmer mounted on the shaft of a motor.

Figure 2 is a side view of the trimmer.

Figure 3 is an end view looking in the conical mouth of the device.

Figure 4 is a central sectional view taken along line 4—4 of Figure 2.

Figure 5 is a view of an ear of corn butted at both ends.

Figure 6 is a view of an ear properly trimmed.

Figure 7 is a diagram showing the relative positions of the knives in a modified arrangement.

The trimmer 10 is shown in Figure 1 connected to a motor shaft 12 by means of a sleeve 14 which is apertured at 15 for a purpose to be described later on in the specification. An apron or housing usually provided for such devices is conventionally indicated at 16 partly in section and an ear of corn 17 which has just been trimmed is shown being moved from the trimmer. The trimmer 10 consists of a substantially heavy body having a connecting collar 20 and a flaring portion 22 provided with a conical mouth 24. The flaring portion has on one or both sides relatively wide slots 26 which are shaped to permit the free discharge of the trimmings produced as the device rotates. One face 28 of each slot is drilled as at 30—30 for receiving screws 31 which engage in the apertures 32 of the blade 33 and hold the blade in position; one or both apertures 32 are elongated to permit the adjustment of the cutting depth of the blade and also to permit the adjustment of the angle of the conical surface generated by the blades as the trimmer rotates. At least one face 28 is preferably as nearly tangential to the inside conical surface of the mouth 24 as is possible without destroying the cutting effect; the edge of the blade is preferably at an angle to a plane passing through the axis of the trimmer and through the edge. The other surface 28 may also be tangential but I sometimes find it desirable to have one of the blades more nearly normal to the conical surface in order to provide a shearing effect. The preferred arrangement of the blades is indicated in Figure 3. However, the arrangement diagrammatically shown in Figure 7 may be used in which only blade 35 is tangential and the other blade 36 is at an angle to the tangent.

Any known means may be used for detachably securing the collar 20 in the sleeve 14 which sleeve may be permanently or otherwise secured to the motor shaft 12, or the sleeve may be an integral part of the body 10. The inside diameter of the sleeve 14 is indicated at S and it is important that this diameter be greater than the inside diameter C of the collar 20 and that the inside diameter C of the collar 20 is in turn greater than the effective dimeter K of the throat 21 of the conical mouth which effective diameter is determined by the shortest distance between the blades and the axis of the device as indicated in Figure 3. It is also important that the apertures 15 in the sleeve be greater in width than the diameter C and preferably equal in width to the diameter S so that any broken ends that pass through the collar 20 may be easily discharged through the aperture.

Referring to Figure 5 the ear of corn 17 is shown butted at the stem end 38 by the usual cut normal to the longitudinal axis of the ear. It is found that if the other end 40 is likewise removed by a normal cut and the end 40 is inserted in a cutting machine (not shown) which removes the good kernels 42, the cutting machine knives indicated diagrammatically at 43 will cut along the lines 44 thus removing a portion of the cob, which portion mixes with the good corn making it less desirable; the outside surface of the cob is indicated by the dotted lines 45. Therefore, it has been found necessary to point or tip the end of the cab as indicated at 47 so that the cutting blades 43 will be guided by the sloping surface so as to cut through the kernels more nearly along the outside surface 45 of the cob, thus removing only the kernels and producing a cleaner grade of corn. When the ears are badly worm-eaten it is found necessary to feed the end into the trimming machine 10 so far that the tip end of the cob indicated at 50 often breaks off at 51 and remains in the trimmer after the ear is removed and passed on to the cutting machine. It is for this reason that I have made the diameter S greater than the inside diameter C of the collar. Since the diameter of the tip 50 is the same as the effective diameter of the throat 21 of the mouth 24 which is smaller than the inside diameter of the collar it is obvious that the broken off tip 50 will easily pass through the collar and be discharged through the aperture 15 as soon as another ear is pushed into the trimmer and thus it is practically impossible to clog the trimmer. As so constructed the trimmer is self clearing and will operate all day long without any attention whatever and needs to be cleaned only at the end of the working period, thus avoiding any delay in this step of the canning process and ensuring a cleaner grade of canned corn.

What I claim is:

1. A non-clogging green corn trimmer comprising a tubular member adapted to be secured to a shaft, an elongated body connected to one end of said member and having a longitudinal bore coaxial with the bore of the member, said body having a conical mouth coaxial and communicating with the body bore and blades projecting into said mouth, the smallest diameter of the solid generated by the blades being less than the diameter of the body bore, one of said blades being substantially tangent to the inner surface of said mouth and the other blade being at a substantial angle to the tangent whereby having a shearing action.

2. In a self-cleaning corn trimming machine, a tubular rotary shaft having an elongated window in one side, a body secured to said tubular shaft and having a conical mouth for receiving the end of an ear of corn, said mouth being coaxial and communicating with the bore of said shaft by means of a throat of less diameter than that of the bore, and blades carried by said body having their edges projecting slightly into said mouth, said flaring body having slots adjacent said blades for discharging the trimmings produced by the blades, said slots being relatively wide throughout their length, and said window being of greater width than the diameter of said throat, whereby the cob ends passing through the throat are thrown out of said window.

3. A non-clogging trimmer for tipping ears of green corn comprising an elongated body having an axial bore therethrough, means at one end of the body for attaching to a shaft for rotation, the wall at said one end having a window therein, the smallest dimension of said window being substantially the same as the diameter of said bore, the opposite end of said bore flaring into a conical mouth of relatively steep slope, said opposite end having a relatively wide slot therein, said slot in plan view being substantially parallel to the axis of the body and being of about the same width throughout its length, a knife secured to the trailing wall of said slot and having its edge jutting slightly into the conical mouth but being substantially parallel with the conical surface, whereby the end of an ear of corn inserted in the mouth is properly beveled for a kernel removing machine, the minimum diameter of the solid generated by the knife being less than the smallest dimension of the window whereby broken cob ends passing into the bore from the knife are discharged out the window.

CHARLES EDWIN RIFE.